US011586072B2

(12) United States Patent
Wang

(10) Patent No.: US 11,586,072 B2
(45) Date of Patent: Feb. 21, 2023

(54) DISPLAY STRUCTURE HAVING A LASER LIGHT WAVELENGTH CONVERSION LAYER

(71) Applicant: CENTRAL WISDOM TECHNOLOGY CONSULTING CORP., Taoyuan (TW)

(72) Inventor: Chiu-Fen Wang, Taoyuan (TW)

(73) Assignee: CENTRAL WISDOM TECHNOLOGY CONSULTING CORP., Taoyuan (TW)

( * ) Notice: Subject to any disclaimer, the term of this patent is extended or adjusted under 35 U.S.C. 154(b) by 58 days.

(21) Appl. No.: 16/951,021

(22) Filed: Nov. 18, 2020

(65) Prior Publication Data

US 2021/0149254 A1    May 20, 2021

Related U.S. Application Data

(60) Provisional application No. 62/938,086, filed on Nov. 20, 2019.

(51) Int. Cl.
*G02F 1/13357* (2006.01)
*G02F 1/1335* (2006.01)

(52) U.S. Cl.
CPC .. *G02F 1/133617* (2013.01); *G02F 1/133514* (2013.01); *G02F 1/133614* (2021.01); *G02F 2201/50* (2013.01)

(58) Field of Classification Search
CPC ......... G02F 1/133617; G02F 1/133514; G02F 1/133614; G02F 2201/50; G02F 1/1333; G02B 5/201; G02B 27/20; G06F 3/0386
See application file for complete search history.

(56) References Cited

U.S. PATENT DOCUMENTS

| | | | | |
|---|---|---|---|---|
| 2009/0195152 | A1* | 8/2009 | Sawano | ................ H01L 27/322 313/506 |
| 2018/0120648 | A1* | 5/2018 | Kim | ................... G02F 1/133528 |
| 2018/0149915 | A1* | 5/2018 | Han | .................... H01L 51/5281 |
| 2018/0284541 | A1* | 10/2018 | Kang | ................ G02F 1/133621 |
| 2019/0072808 | A1* | 3/2019 | Fujiwara | ................. B32B 17/06 |
| 2021/0139770 | A1* | 5/2021 | Pousthomis | .......... H01L 33/501 |

\* cited by examiner

*Primary Examiner* — Kevin Quarterman
(74) *Attorney, Agent, or Firm* — Juan Carlos A. Marquez; Marquez IP Law Office, PLLC

(57) ABSTRACT

A display structure having a laser light wavelength conversion layer includes a display in addition to the laser light wavelength conversion layer. The display has a backlight module and a display panel provided on the light output side of the backlight module. The display panel has a color filter and a light-permeable protective layer formed on the light output side of the color filter. The color filter has a plurality of color sub-pixels. The laser light wavelength conversion layer is formed between the color sub-pixels or on or in the light-permeable protective layer. The display, therefore, can function as a fabric-based projection screen by allowing a laser pointer to generate a visible light point on the images displayed by the display during a presentation.

10 Claims, 8 Drawing Sheets

DISPLAY STRUCTURE HAVING A LASER LIGHT WAVELENGTH CONVERSION LAYER

BACKGROUND OF THE INVENTION

1. Technical Field

The present invention relates to a display structure having a laser light wavelength conversion layer. More particularly, the invention relates to a display structure that has a laser light wavelength conversion layer and can be applied to a display or screen for use in meeting/conference presentations.

2. Description of Related Art

An image projector, or projector for short, is a display apparatus that uses an optical system to enlarge an image and project the image onto a screen. While projectors can be used to play videos or films for entertainment, they are also used in meetings or conferences to project the discussion points on a fabric-based projection screen, on which the laser light point projected from a laser pointer can be used to guide the meeting or conference attendees' lines of sight to enable effective communication.

The use of a projector requires not only a projection screen or other suitable surfaces on which images can be projected, but also a sufficient distance between the projector and the projection screen so that the projected images can be viewed in full; that is to say, in addition to the cost of hardware installation, there are spatial limitations in use. On the other hand, the current development of TV or computer screens has made it possible to make large screens for conference use, and there has been a trend to replace projectors with such screens.

One major problem of using a LCTV or computer screen in a meeting or conference, however, is that the light point projected from a laser pointer becomes invisible on the screen. A mouse pointer, though not as conspicuous as a laser light point, is therefore used instead to guide the process of the meeting or conference, and yet the guiding effect of the mouse pointer is not as good as projecting the light point of a laser pointer on a fabric-based projection screen.

BRIEF SUMMARY OF THE INVENTION

The present invention provides a display structure that has a laser light wavelength conversion layer to solve the problem that a laser pointer cannot be used to guide a person's attention to the presentation material displayed on a display or screen.

The present invention provides a display structure having a laser light wavelength conversion layer. The display structure includes a display in addition to the laser light wavelength conversion layer. The display has a display panel. The display panel has a color filter with a plurality of color sub-pixels and a light-permeable protective layer formed on the light output side of the color filter. The laser light wavelength conversion layer is formed between the color sub-pixels or is formed on or in the light-permeable protective layer.

Implementation of the present invention produces at least the following advantageous effects:

1. The light point of a laser pointer is rendered visible on/in the display surface of a computer display or computer screen; and 2. A computer display or computer screen can function as a fabric-based projection screen by allowing a user to point to the displayed images with the light point of a laser pointer.

The features and advantages of the present invention are detailed hereinafter with reference to the preferred embodiments. The detailed description is intended to enable a person skilled in the art to gain insight into the technical contents disclosed herein and implement the present invention accordingly. In particular, a person skilled in the art can easily understand the objects and advantages of the present invention by referring to the disclosure of the specification, the claims, and the accompanying drawings.

DETAILED DESCRIPTION OF THE INVENTION

Figure 1:
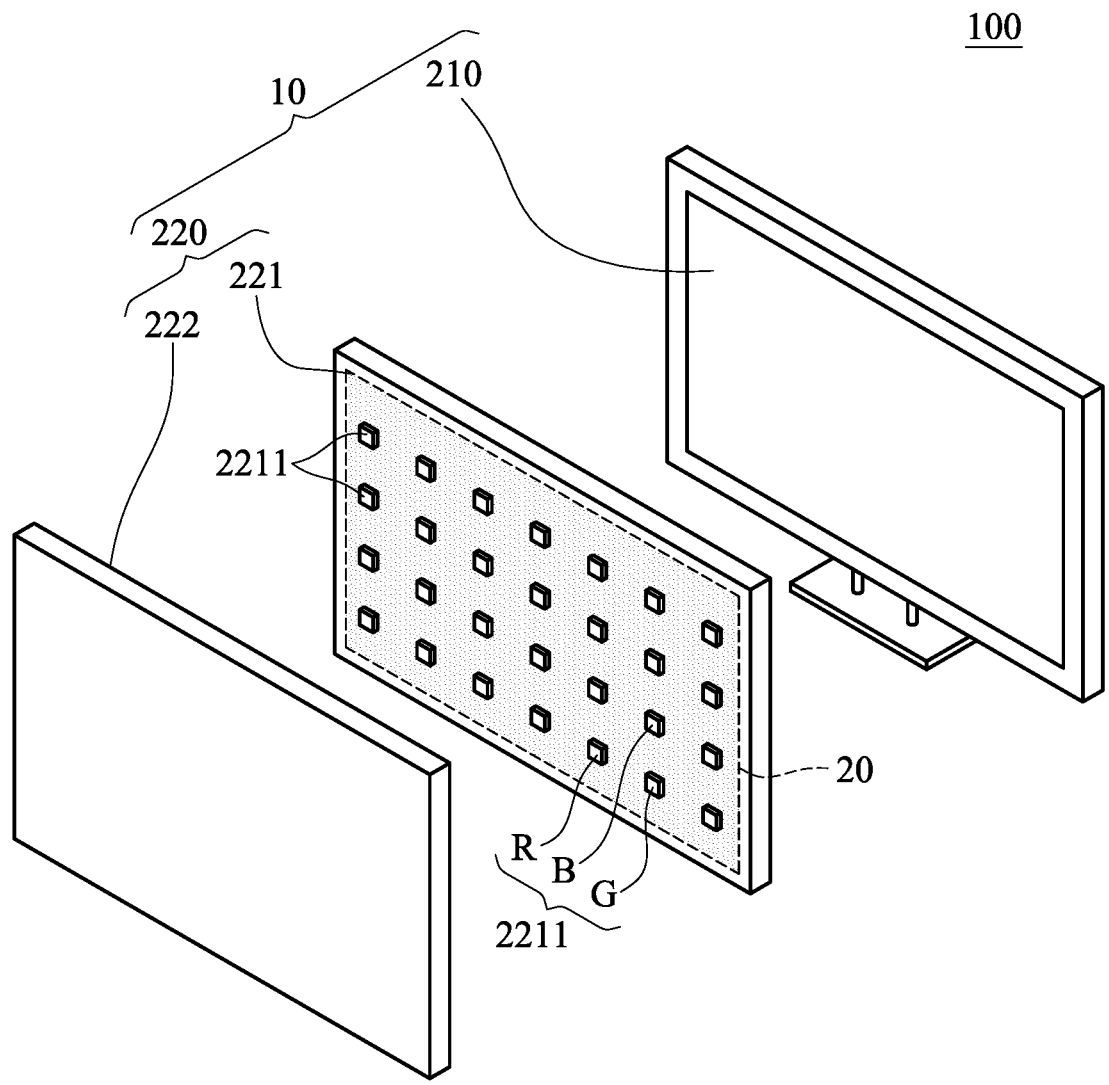
FIG. 1 is an exploded perspective view of a display structure having a laser light wavelength conversion layer.
Figure 2:
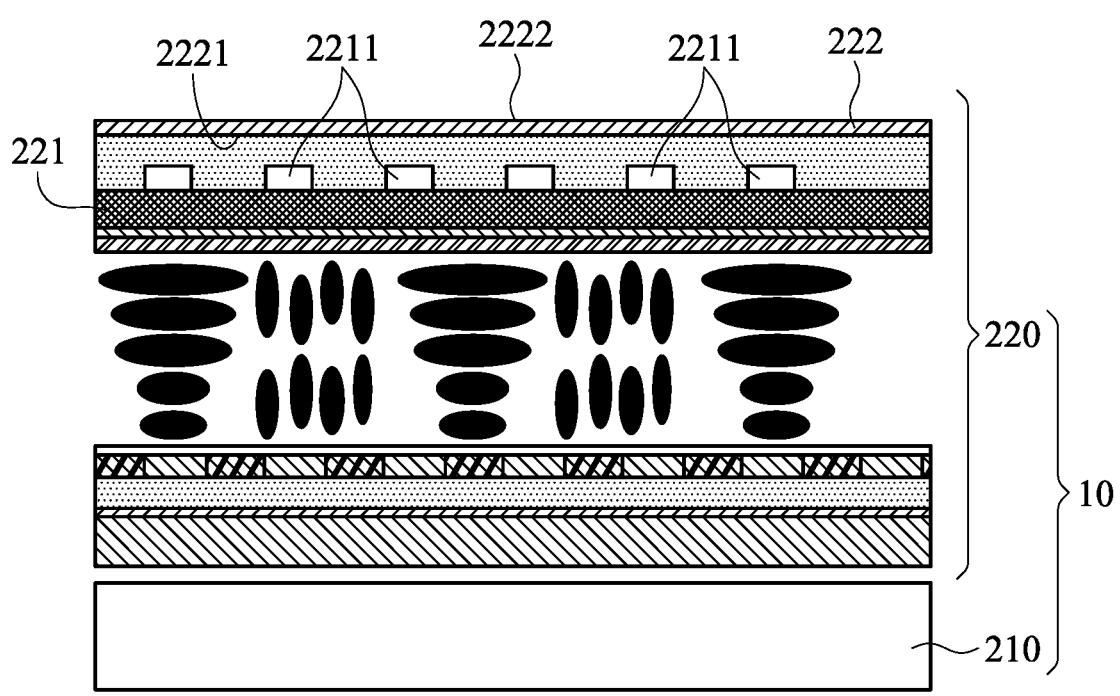
FIG. 2 is a sectional view of the display structure in FIG. 1.
Figure 3:
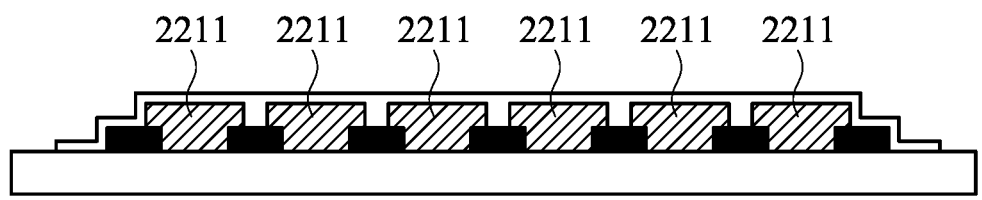
FIG. 3 is a sectional view of a color filter.

Referring to FIG. 1 to FIG. 3, the present invention provides a display structure 100 having a laser light wavelength conversion layer. The display structure 100 includes a display 10 and a laser light wavelength conversion layer 20.

Figure 4:
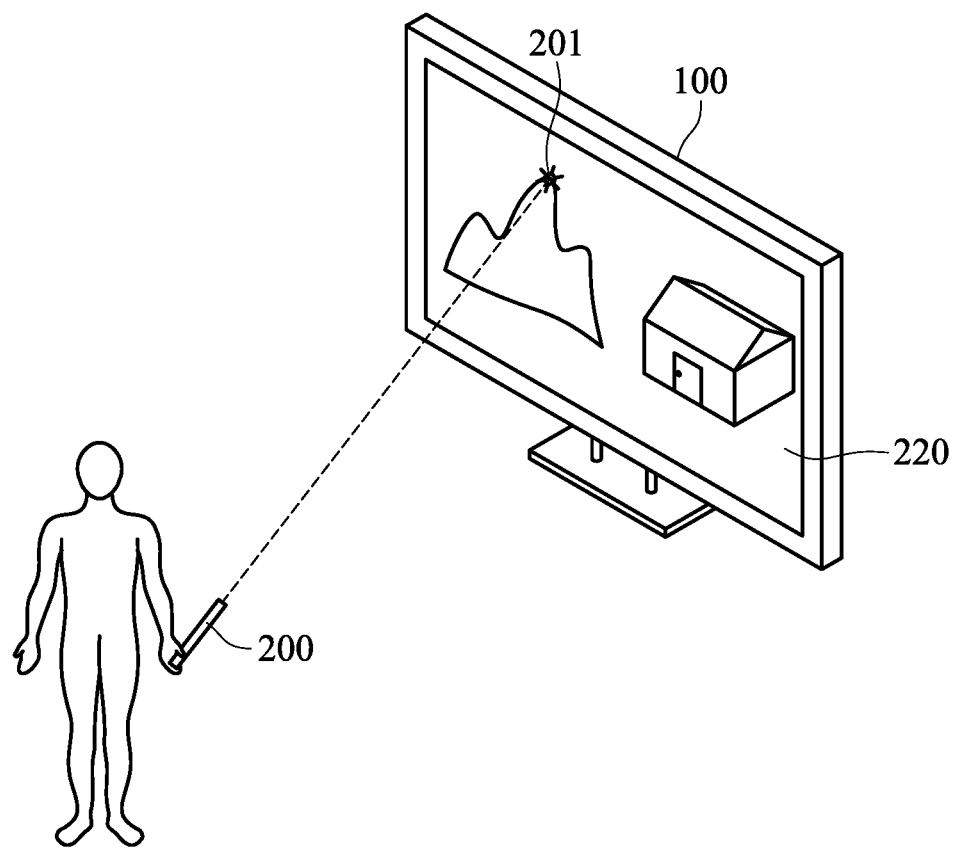
FIG. 4 schematically shows how a laser pointer projects a laser light point onto the display structure of the present invention.
Figure 5:
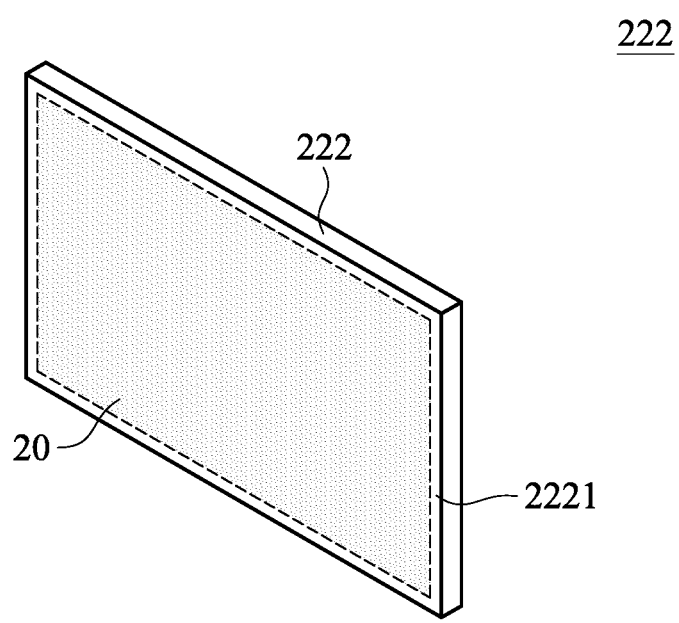
FIG. 5 shows a case in which the laser light wavelength conversion layer is formed on the inner side of the light-permeable protective layer.
Figure 6:
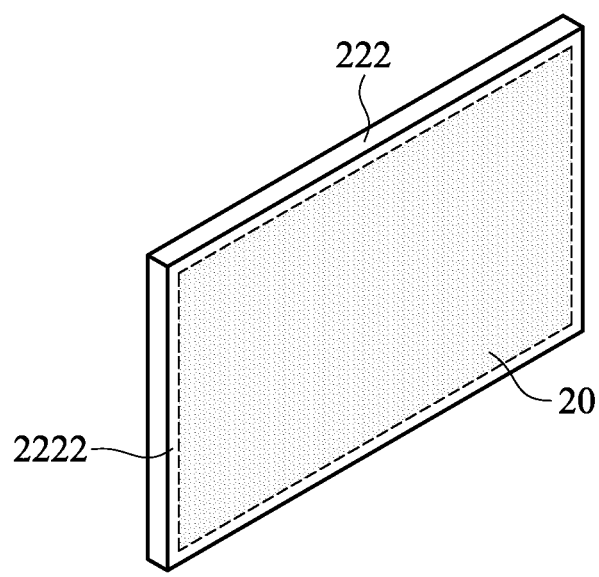
FIG. 6 shows a case in which the laser light wavelength conversion layer is formed on the outer side of the light-permeable protective layer.
Figure 7A:
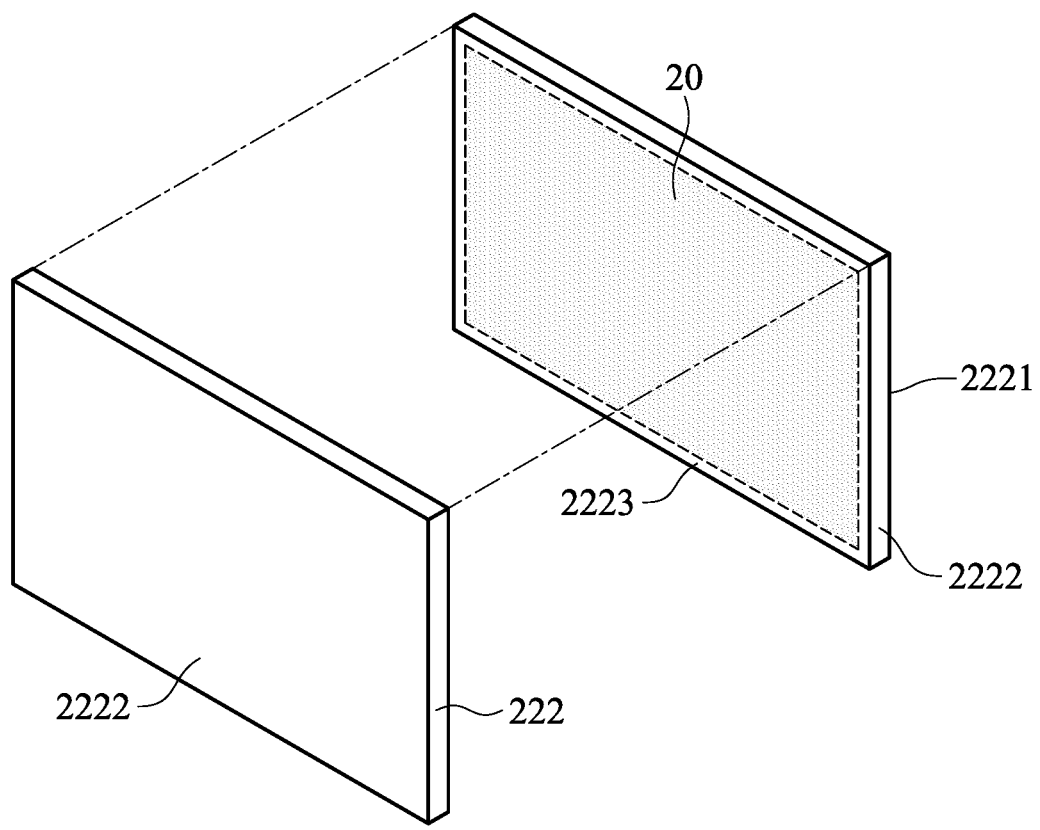
FIG. 7A shows, in an exploded perspective view, a case in which the laser light wavelength conversion layer is formed as an inner sandwiched layer of the light-permeable protective layer.
Figure 7B:
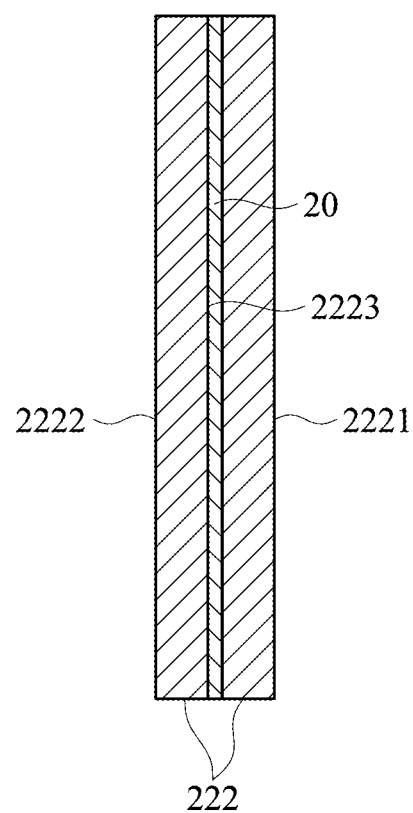
FIG. 7B shows, in an assembled perspective view, a case in which the laser light wavelength conversion layer is formed as an inner sandwiched layer of the light-permeable protective layer.

Referring to FIG. 4 in conjunction with FIG. 1 to FIG. 3, the display 10 in the present invention is provided with the laser light wavelength conversion layer 20 so that when the display structure 100 is used to display presentation material, the presenter may use a laser pointer 200 to guide the audience's attention to any position of the displayed presentation material directly with the laser light of the laser pointer 200.

When the laser light strikes the laser light wavelength conversion layer 20, the laser light wavelength conversion layer 20 is excited by the laser light and generates a light point 201, with which the presenter can highlight wherever in the presentation material that he or she wishes to emphasize.

For example, the display 10 is a liquid crystal display (LCD) 10 that serves as a computer screen or TV screen. The display 10, however, is not limited to a LCD and may instead be an organic light-emitting diode (OLED) display, a plasma display, or the like. The display 10 has a backlight module 210 and a display panel 220.

The backlight module 210 functions mainly as the light source of the display 10 while the display 10 is in operation.

The display panel 220 is provided on the light output side of the backlight module 210, and the display panel 220 has a color filter 221 and a light-permeable protective layer 222.

The color filter 221 has a plurality of color sub-pixels 2211. The color sub-pixels 2211 may include red (R), green (G), and blue (B) color sub-pixels for example. When the light output from the backlight module 210 strikes the R, G, and B color sub-pixels 2211, the three primary colors R, G, and B are generated, and the different light colors are mixed to form a colorful screen image.

The light-permeable protective layer 222 is formed on the light output side of the color filter 221 and serves mainly as a protective layer of the display panel 220. The light-permeable protective layer 222 may be a glass substrate.

The laser light wavelength conversion layer 20 may be formed between the color sub-pixels 2211 at a position that will not block any of the color sub-pixels 2211. Alternatively, the laser light wavelength conversion layer 20 may be formed on or in the light-permeable protective layer 222.

More specifically, referring to FIG. 5, FIG. 6, FIG. 7A, and FIG. 7B, the laser light wavelength conversion layer 20 may be formed on the inner side 2221 of the light-permeable protective layer 222, or the laser light wavelength conversion layer 20 may be formed on the outer side 2222 of the light-permeable protective layer 222. Moreover, the laser light wavelength conversion layer 20 may be formed as an inner sandwiched layer 2223 of the light-permeable protective layer 222.

The above description is only the preferred embodiments of the present invention, and is not intended to limit the present invention in any form. Although the invention has been disclosed as above in the preferred embodiments, they are not intended to limit the invention. A person skilled in the relevant art will recognize that equivalent embodiment modified and varied as equivalent changes disclosed above can be used without parting from the scope of the technical solution of the present invention. All the simple modification, equivalent changes and modifications of the above embodiments according to the material contents of the invention shall be within the scope of the technical solution of the present invention.

What is claimed is:

1. A display structure having a laser light wavelength conversion layer, comprising:
a display having:
a display panel having:
a color filter having a plurality of color sub-pixels; and
a light-permeable protective layer formed on a light output side of the color filter; and
the laser light wavelength conversion layer, formed either between the color sub-pixels at a position that does not block any of the color sub-pixels, or in the light-permeable protective layer.

2. The display structure of claim 1, wherein the display is a liquid crystal display (LCD).

3. The display structure of claim 2, wherein the color sub-pixels comprise red (R) color sub-pixels, green (G) color sub-pixels, and blue (B) color sub-pixels.

4. The display structure of claim 1, wherein the laser light wavelength conversion layer is formed on an inner side of the light-permeable protective layer.

5. The display structure of claim 1, wherein the laser light wavelength conversion layer is formed on an outer side of the light-permeable protective layer.

6. The display structure of claim 1, wherein the laser light wavelength conversion layer is formed as an inner sandwiched layer of the light-permeable protective layer.

7. The display structure of claim 5, wherein the light-permeable protective layer is a glass substrate.

8. The display structure of claim 6, wherein the light-permeable protective layer is a glass substrate.

9. The display structure of claim 7, wherein the light-permeable protective layer is a glass substrate.

10. The display structure of claim 7, wherein the light-permeable protective layer is a glass substrate.

\* \* \* \* \*